Jan. 15, 1963
G. K. HAUSE ET AL
3,073,243
GOVERNOR GEAR PUMP
Filed Feb. 23, 1961
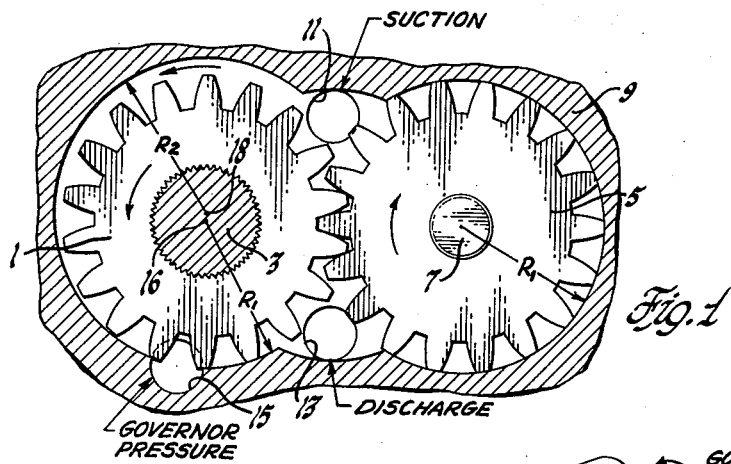
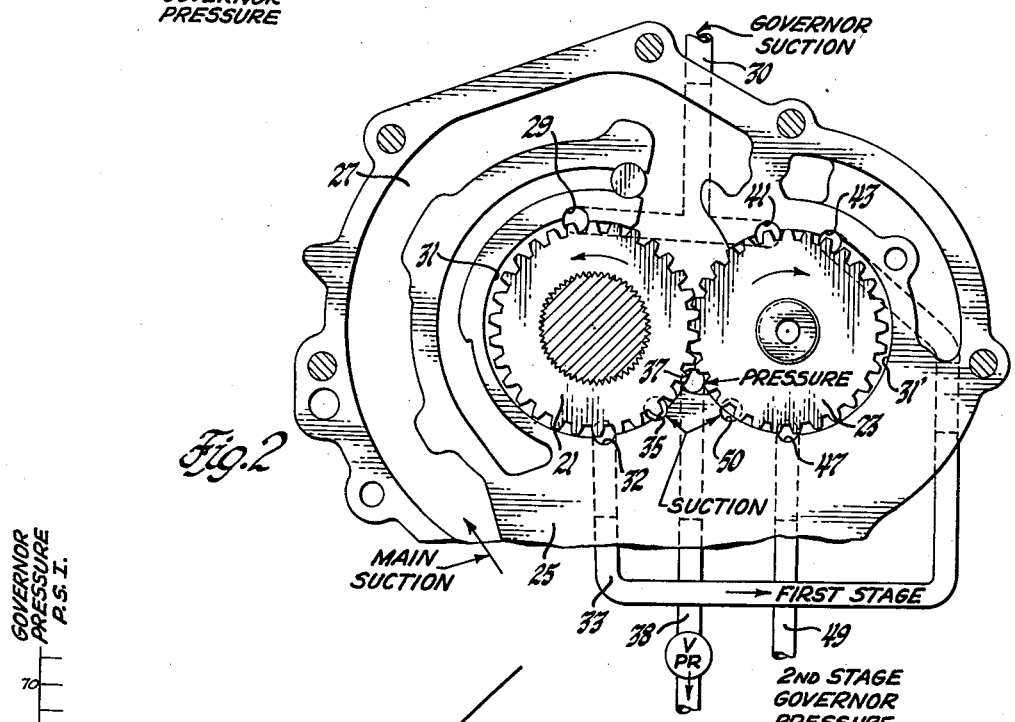
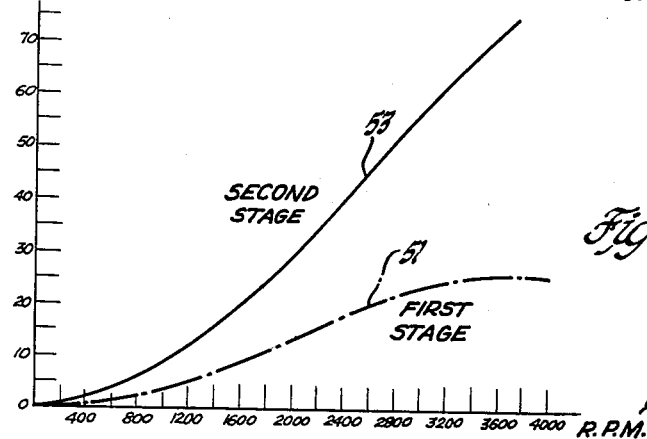
INVENTORS
Gilbert K. Hause,
Clifford C. Wrigley &
BY John Malloy
Robert B. Gerhardt
ATTORNEY

United States Patent Office 3,073,243
Patented Jan. 15, 1963

3,073,243
GOVERNOR GEAR PUMP
Gilbert K. Hause, Bloomfield Hills, Clifford C. Wrigley, Grosse Pointe Woods, and John D. Malloy, Royal Oak, Mich., assignors to General Motors Corporation, Detroit, Mich., a corporation of Delaware
Filed Feb. 23, 1961, Ser. No. 91,268
8 Claims. (Cl. 103—2)

This invention relates to a gear pump and more particularly to a gear pump providing both a volume of fluid under constant pressure and a separate pressure that varies with the speed of the pump.

Transmissions having automatic gear shifts require a hydraulic governor pressure for controlling the shifts in accordance with the speed of certain elements in the transmission, usually the output shaft, whose speed is at some fixed ratio to the speed of the vehicle in which the transmission is being used. In addition automatic transmissions require a quantity of fluid under high pressure for filling fluid couplings or fluid torque converters, as well as for operating servo actuated brakes, clutches, etc.

The governor providing the speed responsive control information to automatic transmission control systems usually is a mechanical centrifugally actuated element which either through mechanical or through hydraulic means provides the speed responsive control. Another type of governor is a positive displacement pump which has its output volume passing through a fixed orifice to provide a pump output pressure which varies with the speed of the pump. Still other forms of governors, such as Pitot tube governors, have been utilized also. All of the governors mentioned above generally have been separated from the fluid pump or pumps supplying the main volume of fluid under pressure to the transmission control system. The positive displacement pump and orifice type governor mentioned requires a continuous fluid discharge and hence the governor pressure obtained therefrom cannot be used in a closed governor pressure system. Furthermore, since the output pressure varies with speed, the output is not suitable for use as a servo pressure.

It would be desirable to provide a single pump apparatus which will provide both a speed responsive governor pressure which can be utilized in the transmission control system and at the same time provide a volume of fluid under a pressure which can be regulated independently of the governor pressure. The ordinary type gear pump is a positive displacement pump that operates by physically moving the quantity of fluid from an inlet or suction passage and positively forcing the same into a discharge passage wherein the pressure is controlled by a regulator valve which operates by exhausting a portion of the fluid being pumped. It has been determined that if the clearance between the teeth of the pump gear and the housing in which the gear is rotating is increased over the normal minimum non-leaking clearance, that, as the fluid is moved or pumped around from a suction to a discharge passage, the pressure of the oil increases in some relation to the gear tip clearance. By providing such a clearance the gear teeth act to impell the oil radially outward against the housing which turns the oil radially inward. This addition motion of the oil is in the form of a vortical path or vortex and results in the oil having an absolute velocity greater than the velocity of the teeth alone. As the speed of the gear increases this vortex action increases. It has also been determined that by carrying the oil around between a progressively decreasing tooth clearance, thus restricting the flow path of the oil, the total velocity of the oil increases even further. This total velocity can be measured as a static pressure which bears a predetermined relation to the speed of the gear. By changing the clearance and the rate of decrease of the same, this speed-pressure relation can be varied.

It is therefore an object of this invention to provide a gear pump that will simultaneously pump a volume of fluid into a pressure regulated system and at the same time provide a static governor pressure which varies in accordance with the speed of the pump.

Another object is to provide a gear pump that provides a volume of fluid under a high pressure and at the same time provides a two stage static governor pressure independently of the high pressure.

This and other objects and advantages will be apparent from the following description and drawing which show and describe several physical embodiments of the invention and in which:

FIGURE 1 illustrates a simple gear pump having both the volume pressure and governor pressure functions;

FIGURE 2 illustrates a two stage governor type gear pump; and

FIGURE 3 shows graphically typical governor pressure curves obtained from pumps constructed in accordance with the invention.

Referring now to FIGURE 1, a simplest form of pump employing the invention, utilizes a driving gear 1 rotated by a shaft 3 and meshing with an idler gear 5 rotatable on an idler pin 7. The gears 1 and 5 rotate in a pump housing 9 which has a suction or inlet port 11, a discharge port 13, and a governor pressure port 15. The gear 1 has a radius $R_1$ and rotates about the center 16. The gear cavity in the housing 9 is constructed so that the wall adjacent the teeth of gear 1 is at a different radius $R_2$ and preferably about a different center 18 to provide a ramp. This arrangement provides a substantial decreasing clearance between the gear teeth and housing wall measured from the inlet port 11 to the governor port 15.

Between the governor port 15 and the discharge port 13, the wall of the housing has the same radius of curvature $R_1$ as the gear to provide zero clearance between the gear teeth and the wall between these points.

When the gear 1 is rotated, oil from the suction port 11 is positively carried around counterclockwise by the gear teeth as in the figure and is also centrifugally impelled radially outward by the teeth. At the discharge port 13 a pressure exists that varies with the speed of the pump. Between ports 15 and 13 the oil is pumped solely by positive displacement action and the pressure will build up to whatever value a relief valve or regulator valve connected to the port 13 will allow. This action between ports 15 and 13 as well as the physical displacement of the oil from the inlet port 11 to the port 15 is the same as in a conventional gear pump. The governor action that takes place between the inlet 11 and governor pressure port 15 is independent of the pressure build up at the discharge port 13. If the port 13 is not restricted or is connected to exhaust so that there is no pressure build up at port 13, the governor effect at port 15 will still take place.

As the speed of rotation of the gear 1 increases, static pressure of the fluid at the governor port 15 increases in the manner shown by the curve 51 in FIGURE 3. By varying the location of the ramp center 18 and the rotational center 16 and hence the ramp effect, the curve 51 can be varied within limits. Similarly by changing the ratio of $R_2$ to $R_1$, the curve 51 can be adjusted to provide different speed responsive characteristics. At the same time, the pressure at port 13 is essentially non-responsive to the speed of the pump as a pressure controlling regulator valve or relief valve is connected thereto that acts to maintain either a fixed pressure or a variable controlled pressure in accordance with some other control criteria.

Examination of the curve 51 shows that the speed responsive characteristics of a single stage pump of the type shown in FIGURE 1 results in a rather flat speed responsive curve having a relatively low maximum pressure and a gradual rise with increased speed. To provide a greater pressure and speed range curve the pump construction shown in FIGURE 2 provides two stages of governor action and will provide governor pressure output similar to the curve 53 of FIGURE 3. The pump construction shown in FIGURE 2 also includes several other features not found in the simple construction of FIGURE 1.

The construction of FIGURE 2 includes a drive gear 21 and a meshing idler gear 23 that rotates in a housing 25. The housing 25 has a main suction passage 27 connected to the gears 21 and 23. In this arrangement both of the gears 21 and 23 rotate within ramp like walls, the gear 21 within a ramp 31 and the gear 23 within a ramp 31'. At the beginning of the ramp portion 31, a governor suction port 29 connects through a passage 30 to the oil sump. This insures a constant supply of fluid regardless of changes in the main suction passage 27 and thereby prevents governor pressure fluctuation due to sudden demands of the transmission on the main pumping function of the pump. At the end of the ramp portion 31 surrounding the gear 21 is a governor pressure port 32 similar to port 15 of the FIGURE 1 construction and which is connected to a first stage governor passage 33. A buffer port 35 connected to the pump sump or suction, is located between the governor pressure port 32 and the main pump discharge port 37. This port 35 acts to buffer the governor pressure at port 32 from fluctuations in the main pump pressure existing in the pump discharge port 37 and a connected pump pressure 38. As in the case of the pump shown in FIGURE 1, the main discharge passage 38 is connected to a pressure regulator valve or relief valve, not shown, which maintains a pressure in passage 38 in accordance with whatever pressure is called for by the transmission control system.

The second governor stage of the pump shown in FIGURE 2 includes the gear 23 and a ramp 31' and an inlet suction port 41 connected to the governor suction passage 30. A governor input pressure port 43 is connected to the first stage governor passage 33, a second stage governor pressure port 47 is connected to a governor passage 49 and a buffer port 50 serves to isolate the main output pressure port 37 from the governor pressure port 47 to prevent fluctuations of governor pressure due to changes in pressure at the output port 37.

The operation of the pump shown in FIGURE 2 will now be described. As the gear 21 turns in a counterclockwise direction shown, the teeth thereon pick up oil from the main suction passage 27 and carry the same around clockwise between the teeth without any build up of pressure. As the oil is carried past the governor suction port 29, the oil has a zero pressure. Because of the clearance between the teeth of gear 21 and the ramp 31, the vortex flow described above begins and the total velocity of the oil gradually increases as the oil is carried around. Because of the decreasing clearance providing a reducing flow path for the oil, this velocity increase becomes even greater. This velocity can be measured as a gradually building pressure until at the first stage governor port 32, the pressure of the oil will vary in accordance with the speed of the gears as shown by curve 51 of FIGURE 3. This speed responsive pressure build up will occur only if there is little or no exhaust of oil from the governor port 32. Thus, the governor pressure should be utilized in a closed system with little or no leakage. As the oil is carried around further by the teeth of gear 21 past the governor pressure port 32, then pressure drops at port 35 to whatever pressure exists at port 35, usually zero pressure. Between the port 35, which acts as a pressure relief port, and the mean pump pressure port 37, the oil pressure builds up rapidly to whatever pressure is called for by the pressu regulator valve or relief valve controlling the pressu in the pump pressure passage 38.

At the same time the gear 23, which is rotating cloc wise as shown, carries a quantity of oil from the ma suction passage 27 around clockwise without any bui up of pressure past the governor suction port 41. B tween the port 41 and the port 43, the pressure of tl oil builds up and when it reaches port 43 it is subject( to and attains the pressure existing in the first sta; governor passage 33. As the oil is carried around fu ther, the vortex and ramp caused increased velocity a1 resultant pressure builds up in the manner described f( the first stage. This continues until at the second sta; governor pressure port 47, the oil has a pressure d pendent pump speed responsive pressure in accordan with curve 53 of FIGURE 3. As mentioned above, tl governor pressure system must be a closed system a1 hence the governor pressure conduit 49 must be co nected to a closed system having little or nominal lea age. As the oil is carried around further by the tee of gear 23, the pressure drops until at the port 50 tl pressure is again at zero or whatever pressure exists the port 50. Between the port 50 and the main pun output port 37, the pressure builds up until it reach pressure called for by the pressure regulator valve co nected to pump pressure passage 38.

It will be seen from the above the gear pump whi( has no additional parts than a conventional gear pum performs a dual function. While the gears are positive displacing a quantity of oil from the main suction pa sage 27 and discharging the same into a pressure co trolled passage 38, the pressure of the oil at vario points along its travel vary so that at particular poir of the travel the pressure of the oil is dependent on tl speed of the pump. By utilizing the governor pressu effect build up by one gear added to the speed pressu build up of the other gear, a governor or pressure cur like curve 53 of FIGURE 3 can be obtained which can l utilized in the transmission control system.

Other gear arrangements and pump constructions cou be used to obtain the governor pressure response 1 quired. Furthermore by changing the length of a1 amount of ramp effect, the governor characteristics c: be varied to obtain whatever pressure curve is desired.

Changes and modifications, as well as other applic tions, will be apparent to those skilled in the art and the are deemed to be within the scope of the invention whi is limited only by the following claims.

What is claimed is:

1. A fluid pressure pump of the type described inclu ing a housing, a pair of meshing gears in said housi1 a series of circumferentially spaced ports in said housi1 connected to one of said gears including in circumfere tial order in the direction of rotation a suction p( located at the mesh point of said gears and on one si thereof, a governor pressure port, and a discharge p( located at the mesh point of the gears and on the oth side thereof from said main suction port, said housi1 being spaced from the periphery of said one gear to for a substantially large clearance throughout a substant portion between said suction and said governor ports a1 a minimum clearance between said governor port a1 said discharge port, said suction port adapted to be co nected to a source of fluid, said substantially large clea ance gradually reducing from a maximum at a poi proximate to said suction port to a minimum at a poi proximate to said governor port.

2. A fluid pressure pump of the type described inclu ing a housing, a pair of meshing gears in said housing series of circumferentially spaced ports in said housi1 connected to one of said gears including in circumfere tial order in the direction of rotation a main suction p( located at the mesh point of said gears and on one si thereof, a second suction port, a governor pressure port, a buffer port and a discharge port located at the mesh point of the gears and on the other side thereof from said main suction port, said housing being spaced from the periphery of said one gear to form a minimum clearance in the portion between said main suction port and said second suction port, a substantially large clearance between said second suction and said governor ports and a minimum clearance between said governor port and said discharge port, said suction ports adapted to be connected to a source of fluid, said governor pressure port providing a source of fluid under pressure responsive to the speed of said gears.

3. The pump of claim 2 wherein said substantially large clearance decreases from a maximum at said second suction port to a minimum at said governor port.

4. The pump of claim 2 wherein said housing has a second series of circumferentially spaced ports connected to the other of said gears including in circumferential order a third suction port, a governor inlet port connected to the governor pressure port of said one gear, a second governor pressure port, and a second buffer port, said housing and the teeth of said other gear forming a minimum clearance between said main suction port and said governor inlet ports, a substantially large clearance between said governor inlet and second governor pressure ports and a minimum clearance between said second governor pressure and said discharge port.

5. The pump of claim 2 wherein said discharge port is connected to a pressure control valve to control the pressure of fluid pumped by said pump from said main suction port to said discharge port.

6. A combined fluid governor and pressure pump including a housing, a pair of meshing gears in said housing rotatable about a pair of spaced axes, said housing having a wall surrounding the periphery of said gears, a suction port in said housing connected to the mesh point of said gears on one side thereof, a discharge port connected to said gears at their mesh point on the other side thereof, said wall having a first portion spaced from one of said gears to form a substantially large clearance between the periphery of the teeth of said one gear and said housing, said clearance extending circumferentially around a substantial portion of the circumference of said one gear between said suction and said discharge ports, a governor pressure port connected to said clearance at a point proximate to said discharge port, said wall having a second portion surrounding the circumference of said one gear between said first wall portion and said discharge port, said second wall portion spaced a minimum distance from the teeth of said one gear to form a minimum clearance, said first substantially large clearance forming a speed responsive fluid governor pressure portion and said minimum clearance forming a positive displacement pumping portion.

7. The governor and pump of claim 6 wherein said wall has a third portion spaced from the other of said gears to form a second large clearance between the periphery of the teeth of the other gear and said housing, said second clearance extending circumferentially around a substantial portion of said other gear between said suction and said discharge ports, a port in said housing connecting said first mentioned governor port with said second clearance at a point proximate to said suction port, a second governor pressure port connected to said second clearance at a point proximate to said discharge port, a fourth wall portion surrounding the circumference of said other gear between said third wall portion and said discharge port and spaced a minimum distance therefrom, said first and second clearance portions, said gears, and said ports forming a two stage speed responsive fluid governor.

8. A combined fluid governor and pump including a housing, a pair of meshing gears in said housing rotatable about a pair of spaced axes, a suction port in said housing connected to the teeth of said gears on one side of their point of mesh and a discharge port in said housing connected to the teeth of said gears on the other side of their point of mesh, a first substantially large clearance portion between the periphery of the teeth of one of said gears and said housing extending circumferentially around a portion of said one gear between said suction and said discharge ports, a governor pressure port connected to said clearance portion at a point proximate to said discharge port, said clearance portion gradually reducing from a maximum at a point proximate to said suction port to a minimum at said governor pressure port, the periphery of the teeth of said one gear and said housing having a minimum second clearance portion circumferentially extending between said governor pressure port and said discharge port, and a pressure control valve connected to said discharge port, said first clearance portion and said gears forming a speed responsive fluid governor providing a fluid pressure at said governor pressure port that varies with the speed of the gears, and said second clearance portion and said gears forming a fluid pressure pump discharging a volume of fluid from said discharge port under a pressure determined by said pressure control valve.

References Cited in the file of this patent

UNITED STATES PATENTS

| 2,424,750 | Heckert | July 29, 1947 |

FOREIGN PATENTS

| 807,870 | Germany | July 5, 1951 |
| 889,908 | France | Oct. 18, 1943 |